Nov. 19, 1957     H. C. JACKSON     2,813,367

FISHING SINKER

Filed Nov. 9, 1956

INVENTOR.
HENRY C. JACKSON,
BY
McMorrow, Berman & Davidson
ATTORNEYS

United States Patent Office 2,813,367
Patented Nov. 19, 1957

2,813,367

FISHING SINKER

Henry C. Jackson, Cave City, Ark.

Application November 9, 1956, Serial No. 621,405

5 Claims. (Cl. 43—44.96)

This invention generally appertains to improvements in fishing apparatus and particularly relates to an improved fishing sinker.

A primary object of the present invention is to provide a fishing sinker which is constructed so that it will quickly sink, even in swiftly moving water, without floating or following a zigzag path, which will be held on the bottom by the weight of the water and which, in retrieving movement, will be able to slide over objects and formations on the bottom without becoming wedged thereagainst.

Another important object of this invention is to provide an open, oval-shaped sinker, which is formed with a laterally extending base flange and which is provided, intermediate the middle and one end with a line attaching means that is disposed below the upper edge and above the center of gravity.

Another important object of the present invention is to provide a fishing sinker of one piece, sturdy construction, which can be inexpensively manufactured.

The foregoing and ancillary objects are attained by this invention, the preferred form of which is set forth in the following description and illustrated in the accompanying drawing, wherein.

Figure 1:
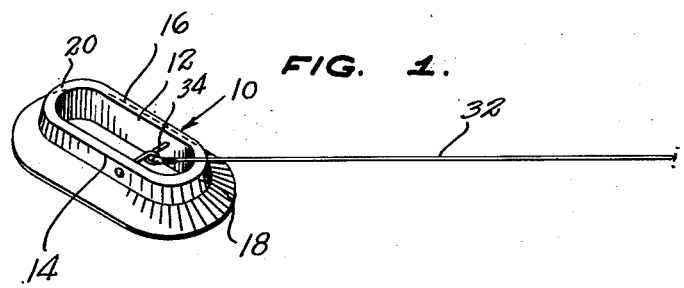
Figure 1 is a perspective view of the fishing sinker, showing the same with a line attached thereto.
Figure 2:
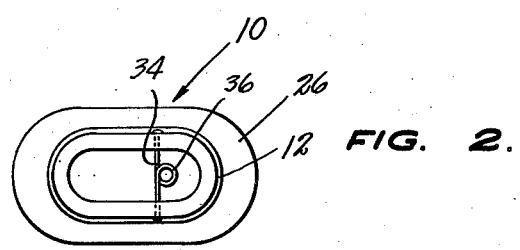
Figure 2 is a top plan view thereof.
Figure 3:
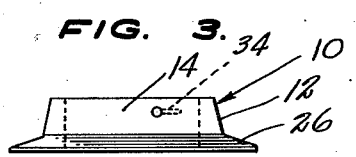
Figure 3 is a side elevational view thereof.
Figure 4:
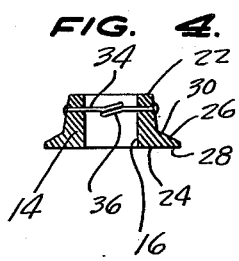
Figure 4 is a transverse sectional view.
Figure 5:
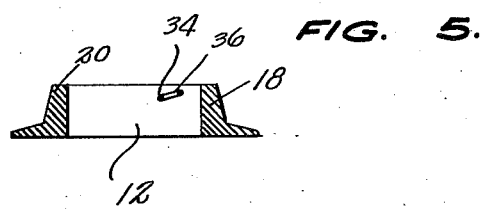
Figure 5 is a longitudinal vertical sectional view.

Referring now more particularly to the accompanying drawing, the fishing sinker 10 includes a body portion 12, which is of oval or ellipsoidal shape and which has opposing sides 14 and 16 and opposing arcuate ends 18 and 20. The sides 14 and 16 are disposed in parallel, transversely spaced relation and are connected by the arcuate ends 18 and 20. The body portion has an upper or top end 22 and a lower or bottom end 24 and the inner surfaces of the sides and ends are disposed at right angles to the top and bottom 22 and 24, which ends are flat and are disposed parallel.

The body portion is provided with a flange base portion 26, which has an underside 28 and an upper side 30, the underside 28 being disposed coplanar and contiguous with the bottom 24. The upper side 30 is sloped downwardly and outwardly from the exterior surface of the sides and ends of the body portion, which surface is sloped upwardly and inwardly. Thus, the inner surfaces of the sides and ends are disposed at right angles to the bottom 24 and the underside 28 of the flange portion 26, while the exterior surfaces of the sides and ends are disposed at an obtuse angle to the upper side 30 of the flange portion.

Means is provided for attaching a line 32 to the body portion and includes a pin 34 which has its ends suitably anchored in the sides 14 and 16 and is disposed transversely between the sides. The pin is formed with a central loop 36, to which one end of the line 32 may be suitably attached, as shown at Figure 1.

It is to be noted that the pin 34 is disposed slightly below the top 22 of the body portion and is positioned intermediate the center and one end 18 thereof. The pin is also disposed above the center of gravity of the sinker.

In use, the sinker, in attachment to the line 32, will quickly sink in a body of water, even in swiftly moving water, without floating or moving in a zigzag path. In other words, because of the open construction of the body portion, the sinker will quickly sink, since the water can pass up through the body portion. Due to the provision of the base flange portion 26, the sinker will be firmly anchored on the bottom of the water, with the weight of the water assisting in holding the sinker in place to prevent any rolling movement of the sinker along the bottom.

Due to the off-center position of the pin 34 and the placement thereof above the center of gravity, together with the flange portion 26, the sinker can be easily retrieved and, during retrieving movements, will easily slide over objects in the water or projections or formations on the bottom and will be prevented from becoming wedged against such objects or formations. In other words, the positioning of the end of the fishing line just under the top of the body portion and above the center of gravity ensures that the sinker will easily slide over objects in the water. In addition, the placement of the end of the line below the top will prevent the tie from becoming worn or frayed, as the sinker is pulled over objects or projections, such as stones or the like on the bottom of the water. If the sinker is pulled against an object, it can easily dislodge itself, since it can turn over endwise or sidewise and, thus, avoid becoming wedged against such objects.

In the latter respect, the construction of the sides and ends of the body portion is of importance, in relation with the positioning of the line attaching pin 34. The base flange portion and the pin 34, in its particular position in the body portion, function as leverage arms for this purpose.

It can thus be seen that a compact, one-piece sinker is provided, which can be inexpensively manufactured and will be very dependable in use.

While the preferred form of this invention has been described herein and shown in the accompanying drawings, other forms may be realized, as come within the scope of the appended claims.

What is claimed is:

1. A sinker comprising an oval-shaped body portion having opposing parallel transversely spaced longitudinal sides and opposing arcuate ends connecting the sides, an oval-shaped base flange laterally extending from the sides and ends of the body portion and formed integral therewith and means carried by the body portion for attaching a line thereto.

2. A sinker comprising an oval-shaped body portion having opposing parallel transversely spaced longitudinal sides and opposing arcuate ends connecting the sides, an oval-shaped base flange laterally extending from the sides and ends of the body portion and formed integral therewith and means carried by the body portion for attaching a line thereto, said base flange having a flat undersurface and the inside surfaces of the ends and sides being at right angles to the undersurface, and said upper surface of the base flange being at an obtuse angle to the exterior surface of the sides and ends.

3. A sinker as claimed in claim 2, wherein said means for attaching a line to the body includes a pin extending across the body portion between the sides and disposed adjacent one end and positioned below the top of the body portion and above the bottom thereof.

4. A sinker comprising an oval-shaped body portion having a top and a bottom edge and having an oval-shaped aperture therethrough, a base flange extending outwardly from the body portion at the bottom edge, a pin extending across the body portion and disposed below the top edge, and above the bottom edge, said pin being positioned between the center and one end of the body portion and having centrally disposed means for receiving a line.

5. A sinker comprising an oval-shaped body portion having a top and a bottom edge and having an oval-shaped aperture therethrough, a base flange extending outwardly from the body portion at the bottom edge, a pin extending across the body portion and above the bottom edge, said pin being positioned between the center and one end of the body portion and having centrally disposed means for receiving a line, said pin being slightly disposed below the top edge and positioned above the center of gravity of the body portion.

References Cited in the file of this patent
UNITED STATES PATENTS

| | | |
|---|---|---|
| 685,263 | Decor | Oct. 29, 1901 |
| 1,802,260 | Kopsho | Apr. 21, 1931 |
| 2,074,057 | Kempe | Mar. 16, 1937 |

FOREIGN PATENTS

| | | |
|---|---|---|
| 10,420 | Great Britain | May 6, 1898 |